United States Patent [19]
Miyamoto et al.

[11] Patent Number: 5,648,949
[45] Date of Patent: Jul. 15, 1997

[54] METHOD AND APPARATUS FOR INFORMATION REPRODUCTION AT VARIABLE REFERENCE LEVEL

[75] Inventors: Harukazu Miyamoto; Hisataka Sugiyama, both of Kodaira; Kiyoshi Matsumoto, Chiba, all of Japan

[73] Assignee: Hitachi, Ltd., Tokyo, Japan

[21] Appl. No.: 597,408

[22] Filed: Feb. 8, 1996

[30] Foreign Application Priority Data

Feb. 13, 1995 [JP] Japan .................................. 7-023737

[51] Int. Cl.⁶ .......................................................... G11B 5/09
[52] U.S. Cl. .......................................................... 369/59
[58] Field of Search .................................. 369/124, 32, 59, 369/58, 54, 44.34, 44.26, 44.35

[56] References Cited

U.S. PATENT DOCUMENTS

| | | | |
|---|---|---|---|
| 4,719,612 | 1/1988 | Kenjyo | 369/124 |
| 4,734,903 | 3/1988 | Shirai et al. | 369/124 |
| 4,819,222 | 4/1989 | Kimura | 369/124 |

*Primary Examiner*—Nabil Hindi
*Attorney, Agent, or Firm*—Antonelli, Terry, Stout & Kraus, LLP

[57] ABSTRACT

A variable readout signal with at least one reference level to obtain digital data having two or more values. Based upon demodulated digital data, a standard level having two or more values is caused to change following the level of a readout signal having two or more values, and the reference level is changed based upon the change of the standard level.

18 Claims, 5 Drawing Sheets

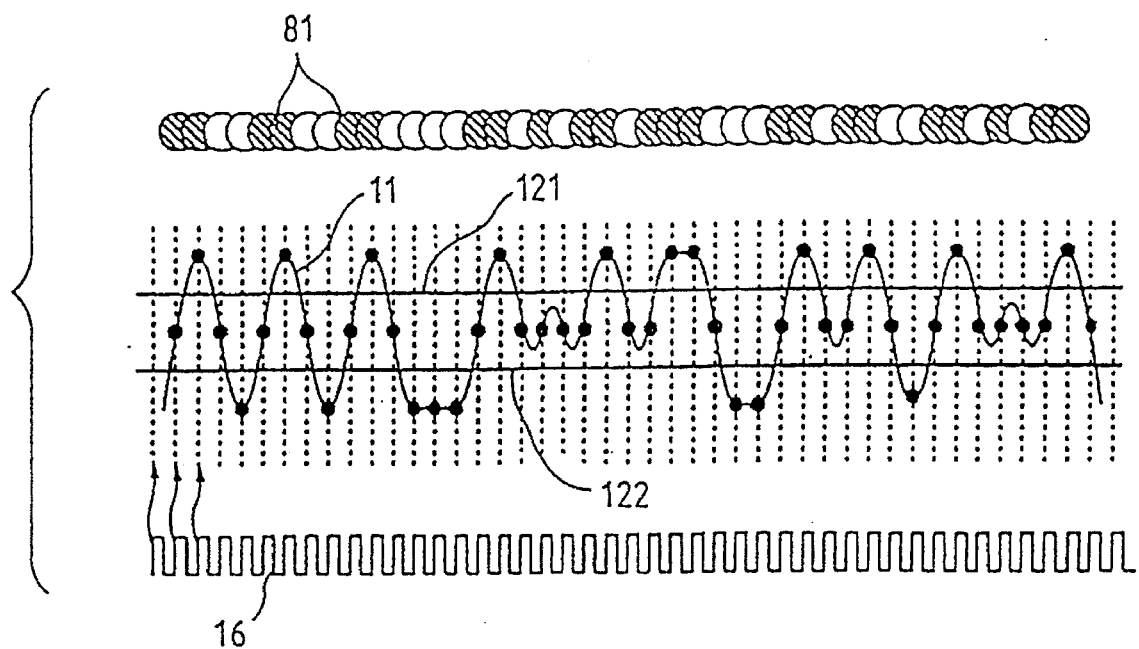
FIG. 3a
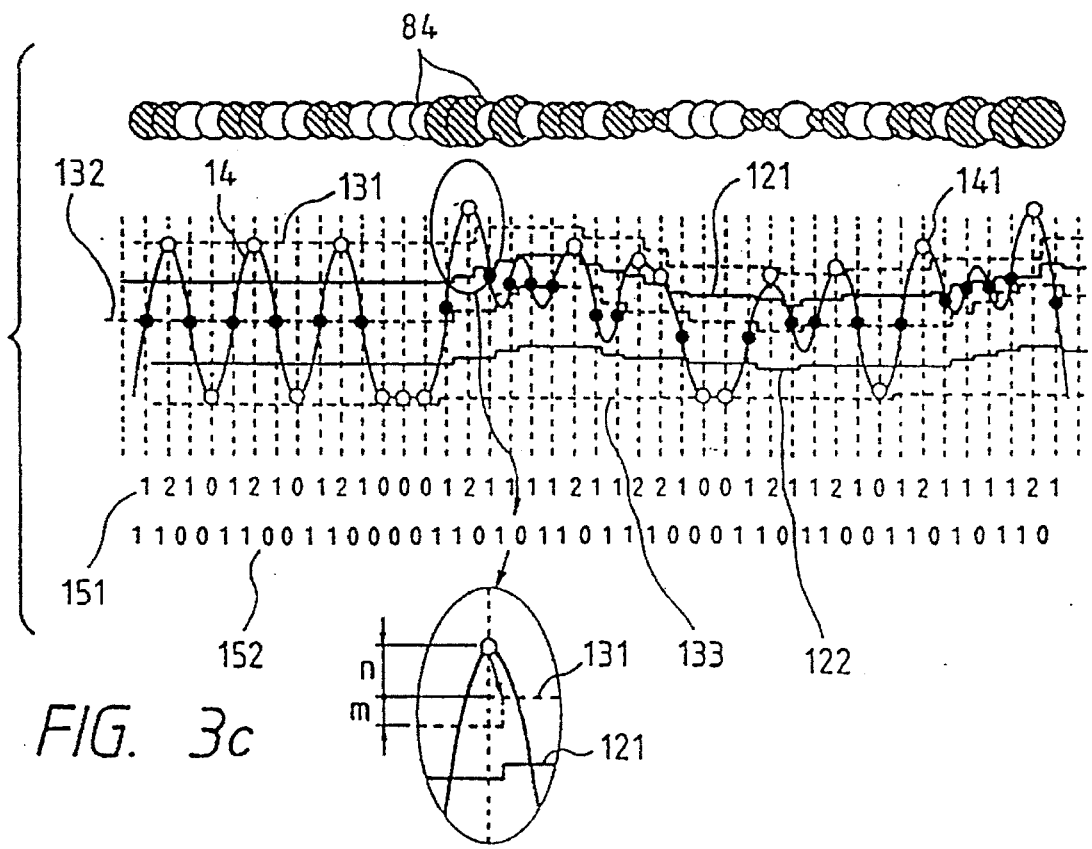
FIG. 3b
FIG. 3c

METHOD AND APPARATUS FOR INFORMATION REPRODUCTION AT VARIABLE REFERENCE LEVEL

BACKGROUND AND SUMMARY OF THE INVENTION

The present invention relates to an information reproduction device such as optical disk and the like. An increased advantage is obtained from an information reproduction device which reads out multi-valued digital signals having two or more values.

In a conventional information reproduction device, a laser beam emitted from an optical head is focused to form an optical spot on a recording medium. The position of the optical spot on the recording medium is controlled by moving the optical head by the scanner while rotating the recording medium. A readout signal obtained by detecting the light reflected from the recording medium is demodulated by a reproduction method having at least a demodulation circuit thereby to obtain reproduced data. The reproduction operation in general is controlled by a central controller.

A readout signal obtained by the conventional information reproduction device and a demodulation method will be described with reference to FIG. 4. Ideally, a readout signal 11 assumes levels of three values, i.e., 0, 1 and 2. Recorded marks for obtaining such a readout signal are arranged at such a density that a maximum of, for example, two recorded marks are included in an optical spot. Then, the number of recorded marks within the optical spot changes in three values, i.e., 0, 1, 2 accompanying the scanning of the optical spot. It is, therefore, made possible to obtain the readout signal 11 having levels of three values, i.e., 1, 2 and 3 as shown in FIG. 4a. In order to demodulate the recorded data from the readout signal 11, the two reference levels 121 and 122 are set between 2 and 1, and between 1 and 0. The readout signal is compared with the two reference levels to thereby obtain demodulated data of 0, 1 and 2. As required, the data may be further decoded to obtain binary data of 0 and 1.

The above-mentioned prior art has been disclosed in, for example, Japanese Patent Laid-Open No. 236823/1990.

The above-mentioned prior art, however, involves a problem in that demodulation error takes place when the level of the readout signal undergoes a change even when the change is in a low-frequency range being affected by dispersion in the size of the recorded marks as shown in FIG. 4b and by the substrate retardation.

In order to solve the above-mentioned problem, the object of the present invention is to provide a high-density information reproduction method and device that are capable of virtually maintaining the quality of readout signals and suppressing the occurrence of error even when the level of the readout signal has changed due to dispersion in the size of the recorded marks and substrate retardation.

The following means is employed in order to accomplish the object of the present invention.

Referring to FIG. 5, the readout signal 14 is compared with at least one of reference levels 121 and 122 in order to demodulate digital data having two or more values. The reference levels 121 and 122 are set based upon standard levels. Referring to FIG. 5, for instance, the reference level 121 is set to lie between standard levels 131 and 132. The reference level 122 is set to lie between standard levels 132 and 133. In FIG. 5, for instance, a level equidistant from the two standard levels is used as the reference level.

In the present invention, the standard level corresponding to the demodulated digital data is caused to change following the level of the readout signal. In FIG. 5, for instance, the digital signals having three values of 0, 1 and 2 correspond to the standard levels 133, 132 and 131, respectively. When a digital signal demodulated at a given timing is 0, the standard level 133 is changed following a change of the readout signal. As a result, the reference level 122 undergoes a change. When the digital signal demodulated at a given timing is 1, the standard level 132 is changed following the change of the readout signal. As a result, the reference levels 121 and 122 undergo a change. When the digital signal demodulated at a given timing is 2, the reference level 131 is changed following the change of the readout signal. As a result, the reference level 121 undergoes a change.

As described above, any one of the standard level 131, 132 or 133 is caused to change following the level of the readout signal. The reference levels 121 and 122 are changed based on the standard level that has changed following the above-mentioned change.

Even when the level of the readout signal changes, therefore, the reference level to be compared is caused to change following the level of the readout signal at all times. Therefore, the S/N ratio virtually increases making it possible to reproduce information suppressing the error rate down to a practically very low level.

The readout signals may be analog signals or multi-value digital signals having not less than three values. The present invention makes it possible to demodulate even those signals which are usually difficult to demodulate.

The demodulation into the digital data may be executed after every predetermined time interval (e.g., clock). This makes it possible to reliably detect and follow the level of the readout signal even when the frequency response of the signal is delayed behind the channel clock frequency.

Moreover, the time interval may be changed depending upon the comparison of the readout signal with the standard level. It is desired that the timing (phase of detection clock) of comparison of the readout signal with the standard level is changed based upon the difference between the standard level and the level of the readout signal to control it by feedback. This makes it possible to control the time in response to a deviation in the signal phase during the reproduction and, hence, to reproduce information maintaining wider margin.

It is further allowable to employ a drawing step which brings the standard levels of two or more values close to the level of the corresponding readout signal by using, as a data readout signal, a signal that corresponds to the known corresponding data. This makes it possible to reliably set the standard level in an initial state. In this case, it is desired to use, as a readout signal, a signal having a predetermined time duration that enables a known signal to be obtained or to use, as a recording medium, the one having a particular (learning) region that enables a known signal to be obtained.

The following means is employed to constitute the present invention as a device.

That is, an information reproduction device comprising a readout signal detection circuit for detecting a readout signal, one or more reference level generators, and a level comparator for comparing the reference levels generated by the reference level generators with the readout signal, the information reproduction device further comprising two or more standard level holders for holding standard levels, a selector for selecting any one of a plurality of standard levels based upon the result of comparison by a level detector, end level compensators for compensating the standard levels based upon the comparison of the standard level selected by the selector with the level of the readout signal, wherein the reference level generators generate reference levels based upon a plurality of standard levels.

Accordingly, even when the level of the readout signal changes, the reference levels to be compared change following the level of the readout signal at all times, making it possible to virtually improve the S/N ratio and to carry out the reproduction suppressing the error rate down to a practically very low level.

The invention is further concerned with an information reproduction device comprising a timing controller for generating clocks maintaining nearly a constant time interval, a sampling/holding circuit for sampling and holding the readout signal maintaining nearly a constant time interval based upon a clock generated by the timing controller, one or more reference level generators, and a level comparator for comparing the reference levels generated by the reference level generators with the readout signal, the information reproduction device further comprising two or more standard level holders for holding standard levels, a selector for selecting any one of a plurality of standard levels based upon the result of comparison by a level detector, and level compensators for compensating the standard level based upon the comparison of the standard level selected by the selector with the level of the readout signal, wherein the reference level generators generate reference levels based upon a plurality of standard levels.

It is thus made possible to reliably detect and follow the level of the readout signal even when the frequency response of the signals having multi-valued levels is delayed behind the channel clock frequency of the signals.

It is further desired to provide the standard level holders in a number larger than that of the reference level generators. It is thus made possible to easily cope with the readout signals having digital data of three or more values.

It is desired that the timing controller has a function for controlling the phase of the clocks based upon the level compensation data from the level compensators. This makes it possible to control the time in response to a deviation in the phase of the signals during the reproduction and, hence, to carry out the reproduction maintaining a wider margin.

In the present invention, the reference levels that serve as standards for comparison at the time of demodulating the readout signal are varied with the change of readout signal. A plurality of standard levels corresponding to the level of the readout signal are corrected according to the data demodulated from the readout signal so as to be in agreement with the level of the readout signal detected at a given moment. Even when the signal level changes, therefore, the data can be demodulated without any increase in the error rate provided the change of the signal level is within a range in which the standard level can follow.

BRIEF DESCRIPTION OF THE DRAWINGS

FIGS. 3a and 3b are diagrams of waveforms illustrating the operation of the information reproduction device of the present invention;

DETAILED DESCRIPTION OF THE INVENTION

Figure 2:
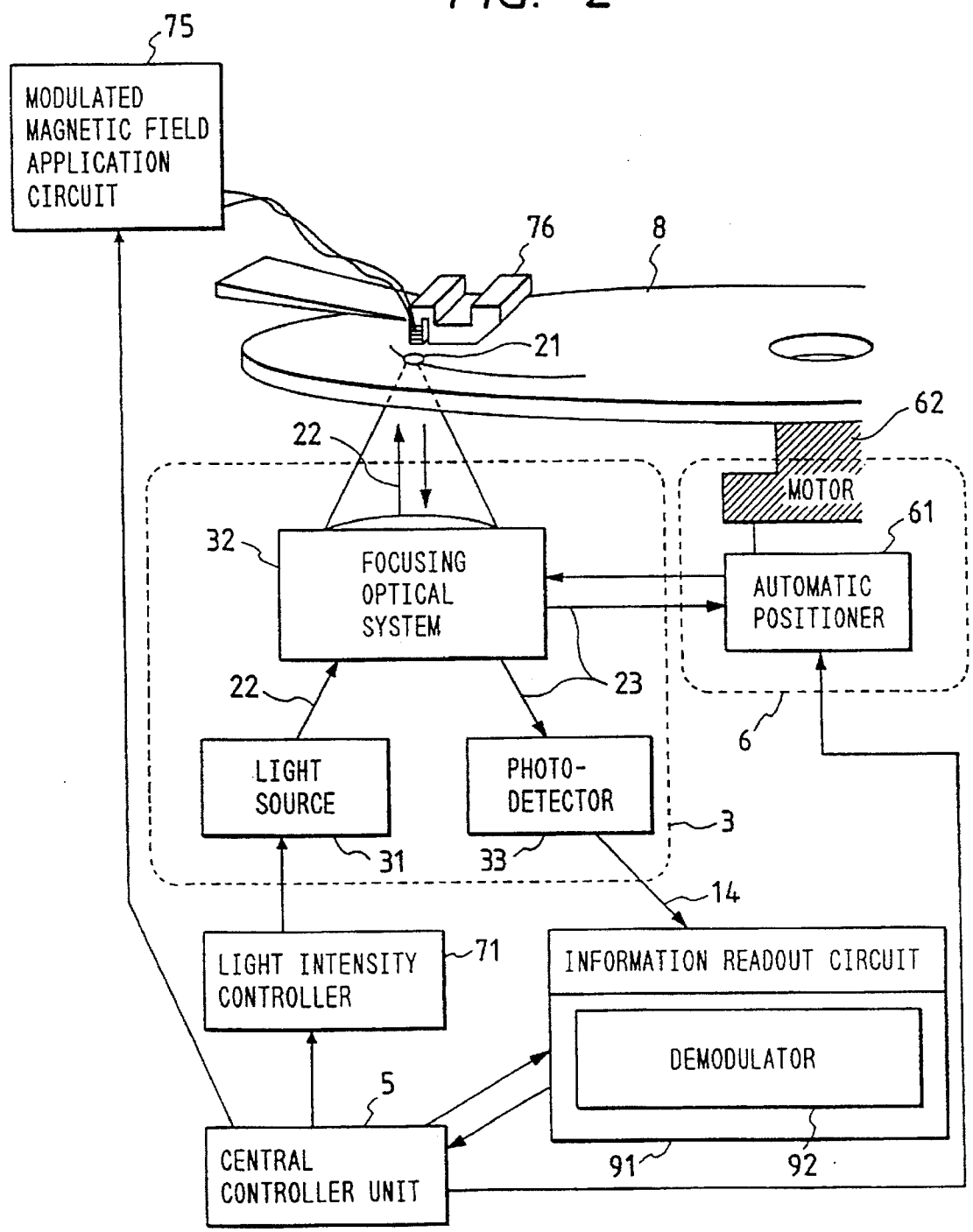
FIG. 2 is a block diagram of the information reproduction device according to the embodiment of the present invention.
Figure 4A:
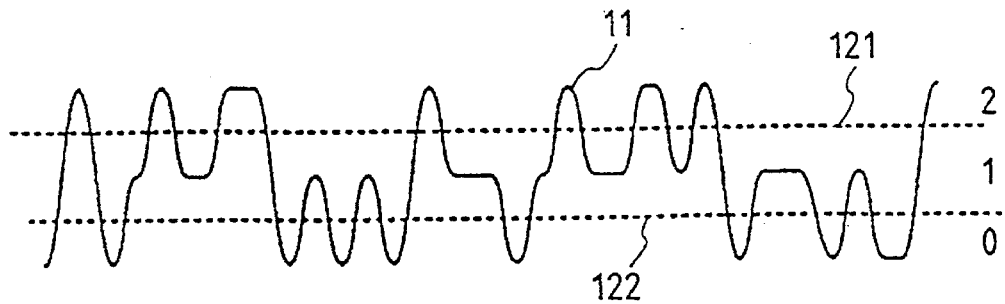
FIGS. 4a and 4b are diagrams of waveforms illustrating a relationship between readout signals and a conventional demodulation method.
Figure 4B:
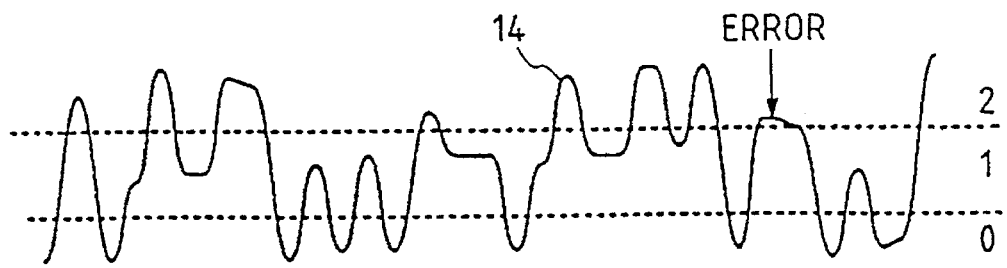

FIG. 2 illustrates an example in which the present invention is applied to a magneto-optical record/reproduction device.

In this embodiment, a laser diode having a wavelength of 680 nm is used as a light source 31. The intensity of the laser diode is controlled by a light intensity controller 71 having an automatic light power control function. The light 22 emitted from the light source 31 is focused by a focusing optical system 32 on a magneto-optical recording medium 8. The optical spot can be moved to any place on the magneto-optical recording medium 8 by a scanning means 6. In this embodiment, the scanning means 6 includes a motor 62 for turning the disk-like magneto-optical recording medium 8 and an automatic positioner 61 having an automatic focus control function and an automatic tracking function. The light reflected from an optical spot 21 is guided to a photo detector 33. A readout signal 14 converted into an electric signal by the photo detector 33 is sent to a reproduction circuit 91 made up of a demodulation circuit and the like circuits and where the recorded data is demodulated. These operations are all monitored and controlled by a central control unit 51 which also controls the exchange and recording of recorded and readout data relative to the external unit. To record the data, a magnetic field modulated by, for example, a modulated magnetic field application circuit 75 is applied to magnetize the recording medium 8 in a desired direction. In this embodiment, a particularly important portion is a reproduction circuit 91 which will now be described in detail.

Figure 1:
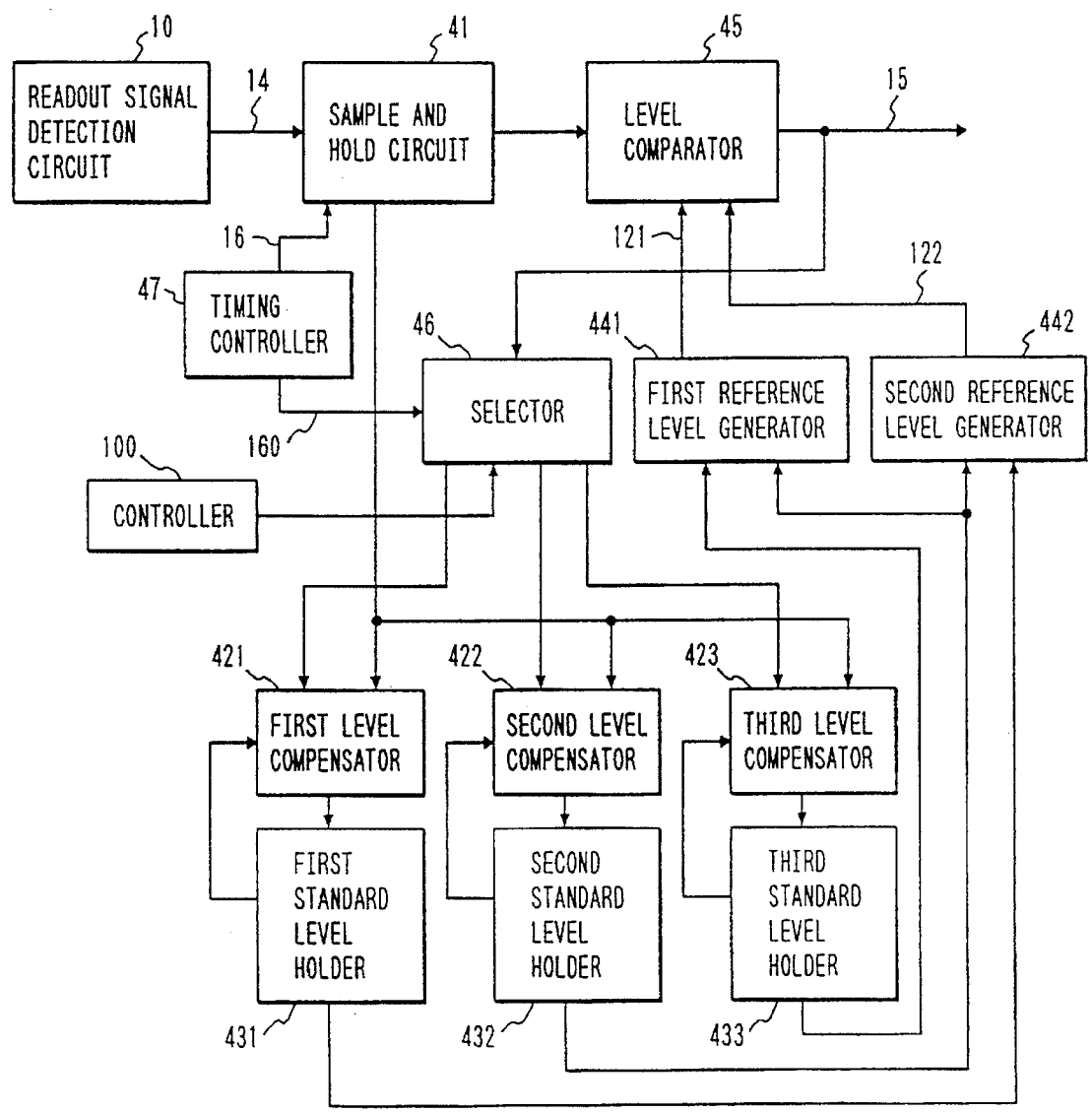
FIG. 1 is a block diagram of an information reproduction device according to an embodiment of the present invention.
Figure 5:
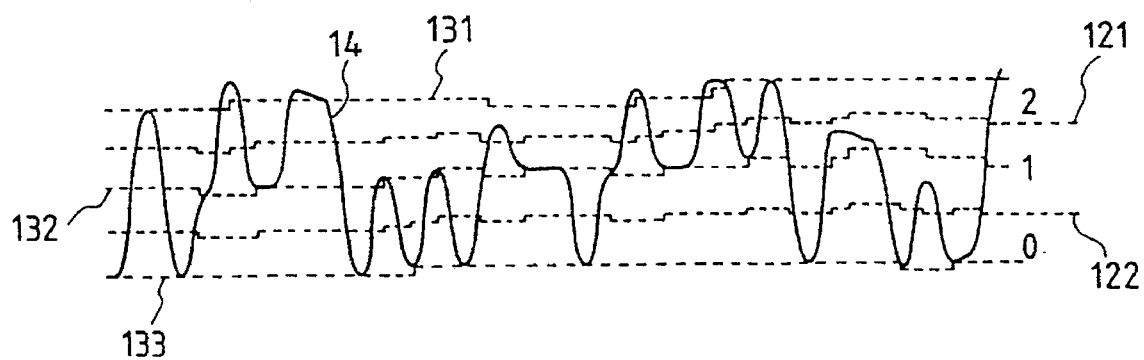
FIG. 5 is a diagram of waveforms illustrating the readout signals and the operation of an information reproduction method of the present invention.

FIG. 1 illustrates the constitution of the reproduction circuit 91 and FIG. 5 illustrates the outline of waveform processing. A signal level sample-and-hold circuit 41 inputs a readout signal from a readout signal detection circuit 10; i.e., the signal level sample-and-hold circuit 41 detects and holds the readout signal 14 at a timing of a clock signal 16 from a timing controller 47. The signal level sample-and-hold circuit can be a known circuit. A level comparator 45 compares the level of the signal detected and held by the signal level sample-and-hold circuit 41 with reference levels 121 and 122 formed by a first reference level generator 441 and a second reference level generator 442. Based upon the results of comparison, the level comparator 45 forms demodulated data 15 having three values of 0, 1 and 2.

In response to the levels 0, 1 and 2 of ternary data 15, a selector 46 selects any one of a first level compensator 421, a second level compensator 422 or a third level compensator 433, and actuates it at a timing designated by a clock signal 160 from a timing controller 47. The level compensator 421, 422 or 423 compares the signal that is detected and held by the signal level sample-and-hold circuit 41 with a standard level held by a standard level holder 431, 432 or 433, and corrects the standard level that has been held so as to interiorly divide the signal and the standard level into 5:1.

Though the invention does not necessarily remain adamant on the ratio of 5:1, what is important is this "interior division". Moreover, the first reference level Generator 441 generates a reference level of a value intermediate between a second standard level and a third standard level, and the second reference level generator 442 generates a reference level of a value intermediate between a first standard level and the second standard level.

FIG. 3 illustrates in detail the operation of the device of FIG. 1.

Referring to FIG. 3a, a readout signal 11 from a magneto-optical recorded mark 81 recorded at an 8/9 modulation channel is equalized as required to exhibit partial response PR11 characteristics. The timing controller 47 generates clocks 16 based, for example, upon pits in a sampled servo format disk. The readout signals 11 are detected and held by the signal sample-and-hold circuit 41 at the timings of the clocks. In FIG. 3a, the timings that are detected and held are represented by broken lines, and the levels are represented by black circles. In the case of the readout signals 11 from the magneto-optical recorded marks 81 of FIG. 3a, the levels that are detected and held are completely divided into three values.

When the recorded marks 84 having varying sizes are formed as shown in FIG. 3b, on the other hand, the readout signals 14 vary up and down accompanying the change. This change is caused by a fluctuation in the recording laser output and by dispersion in the recording sensitivity of the medium. Usually, a change in the low-frequency range is predominant. The sample-and-hold level varies up and down accompanying the change in the readout signals 14, making it difficult to divide the level into three values.

In the present invention, however, standard levels 131, 132 and 133 are employed to correspond to the levels 2, 1, 0 of ternary demodulated data, and are corrected by being compared with the sample-and-hold level.

In this embodiment, therefore, a signal level (white circle) held by the signal level sample-and-hold circuit 41 is compared with the standard level 131 is corrected into a level that interiorly divides the two levels into m:n as shown in an ellipse of FIG. 3b. That is, as shown, the interior division represents a division of the difference in the two levels according to the ratio m:n. The timing for correcting the standard level 131 is slightly delayed behind the sample-and-hold timing. This is to detect and hold the signal by the signal level sample-and-hold circuit 41 and to correct the level after it is compared by the level comparator 45. Owing to this correction, the standard level 131 follows a change in the level of the readout signal 14. Accordingly, the first reference level 121 generated as an intermediate value between the first standard level 131 and the second standard level 132, nearly follows the intermediate value between the level 2 and the level I of the readout signal, making it possible to generate demodulated data 15 without error even when the readout signal 14 is changed. In this embodiment, the ternary demodulated data 151 is decoded into binary demodulated data 152.

When the ratio of interior division m:n is set to be 5:1 in this embodiment, the level can be correctly followed (accuracy of 5%) through the level correction of about 15 times. With the 8/9 modulation channel, the levels of three values reliably appear at least once in one byte (9 channel bits). Therefore, the level is almost followed through a period of 15 bytes. This means that the noise of a frequency lower than the period of 15 bytes is all suppressed. In this embodiment, the high-density recording is effected with a bit length of 0.4 μm and the data is reproduced at a linear velocity of 10 meters a second. This equals to the data transfer rate of about 3 megabytes/sec., while suppressing all of those noises having frequencies lower than 200 kHz. The frequency of 200 kHz corresponds to about 50 μm. In this range, retardation and dispersion in the media sensitivity are very small, and noise which becomes a problem in practice is almost all suppressed making it possible to reproduce the data maintaining a high S/N ratio. The present invention makes it possible to improve the S/N ratio by about 3 dB.

When the data are to be recorded using the device of FIG. 2, the recording light 22 of which the intensity is controlled by the light intensity controller 71 is permitted to fall in the form of pulses on the magneto-optical recording medium 8 to form an optical spot 21. A recorded domain is formed on a region of the medium that is heated by the optical spot 21 nearly to a Curie temperature. In this embodiment, the recorded domain 41 is presumed to have a width of about 0.6 μm. The magneto-optical recording medium 8 includes a recording film of the TbFeCo type. This medium 8 has a Curie temperature of about 200° C. Therefore, the light intensity is so controlled that the temperature exceeds 200° C. on a region of the width of about 0.6 μm on the magneto-optical recording medium 8. The light intensity in this case is 6.5 mW. A magnetic field modulated by the modulated magnetic field application circuit is applied to the vicinity of the region having the width of about 0.6 μm on the magneto-optical recording medium 8 while this region is being heated at a temperature in excess the Curie point thereof. Accordingly, magnetization of the region having the width of about 0.6 μm is oriented in the direction of the modulated magnetic field, enabling the data to be recorded.

Next, described below is the procedure for initially setting the level according to the present invention. A sinusoidal wave of the third period from the left of the readout signal 14 of FIG. 3b is that of a readout signal from a standard mark for initially setting the level. The standard mark has a known pattern, and it is known to which standard level the signal level that is detected and held corresponds without the need of comparing the levels. Therefore, the selector 46 is controlled by an initial level setting circuit 100 to select the first level, second level and third level in accordance with a known data pattern formed by the standard mark. At this moment, the ratio of interior division is changed as required. When it is changed to, for example, 1:1, the level can be followed almost correctly (accuracy of about 6%) through the level correction of three times. Practically sufficient performance is obtained if a known standard mark for setting the level is formed in one block (about 10 bytes) in one sector. In this case, the reduction of the capacity is not larger than 1%, which is virtually negligible.

Figure 6:
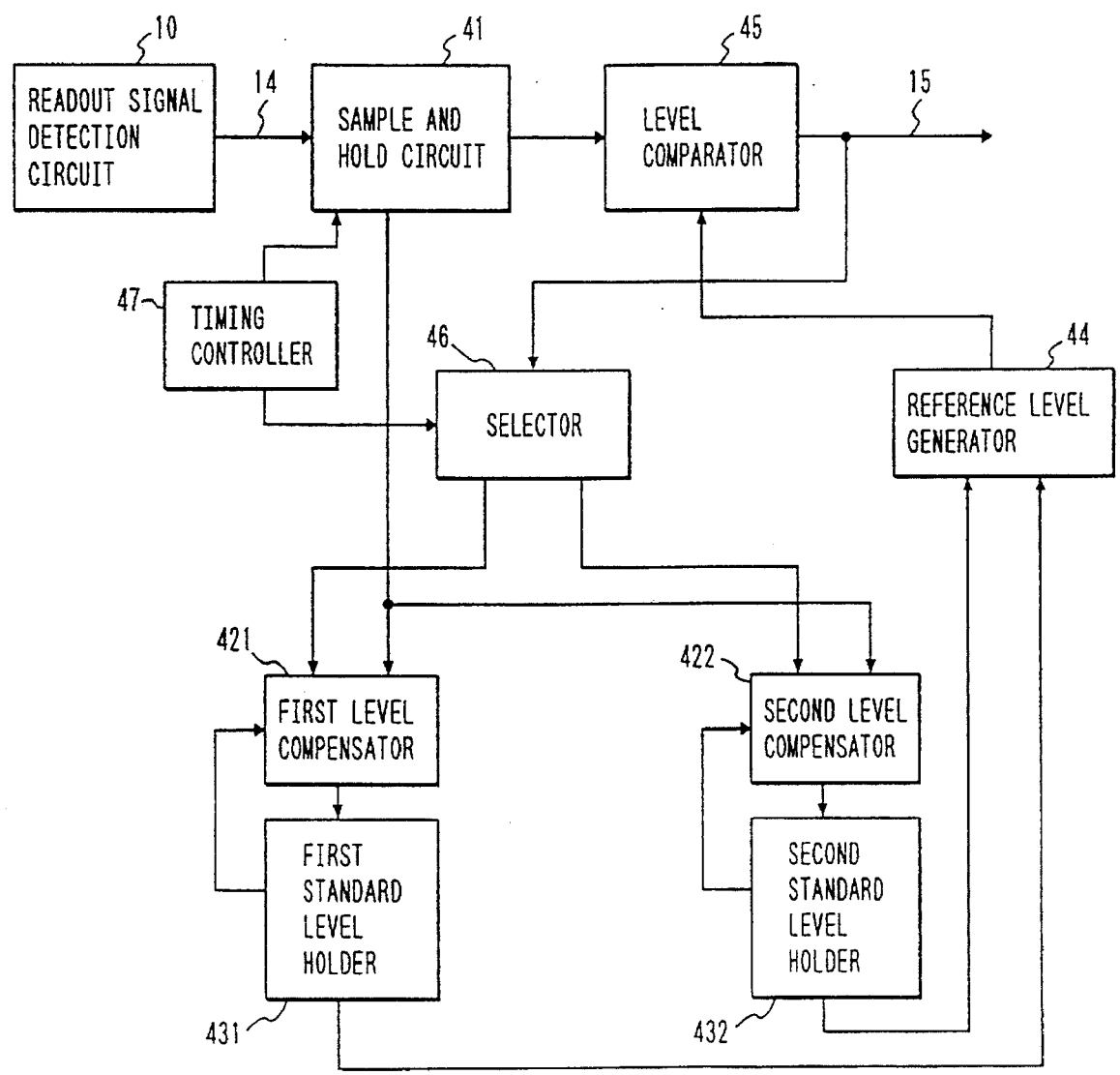
FIG. 6 is a block diagram of the information reproduction device according to another embodiment of the present invention.

FIG. 6 illustrates another constitution of the information reproduction circuit 91 used for the magneto-optical record/reproduction device. Other portions of the device may be the same as those of FIG. 2. The same constitutions as those of FIG. 1 are denoted by the same reference numerals and their description is omitted. In this embodiment, the readout signal including binary digital data is reproduced. Therefore, only one reference level generator 44 is provided to form demodulated data "1" and "0", those are corresponding to the above and below of the reference level. The level compensators 421, 422 and the standard level holders 431, 432 are provided in pairs to meet the demodulated data 15 having values 1 and 0. Even in this embodiment, the principle of operation and effects are nearly the same as those shown in FIG. 1. The reference level is formed following the change in the level of the readout signal. Therefore, the demodulated data can be reliably obtained without error even when the readout signal is varied due to variation in the size of the recorded mark and low-frequency noise such as birefringence.

Described below is a method of controlling the phase of the timing controller. In this case, there are provided the second standard level holders 432 and the standard level compensate 422 in pairs. These two pairs are divided into those for a signal corresponding to the leading edge and those for a signal corresponding to the trailing edge. When the phase of the detection clock 16 deviates out of the ideal state, a difference occurs between an average level of the readout signals that correspond to the leading edge and an average level of the readout signals that correspond to the trailing edge. Therefore, even the standard level that has changed following the level develops a difference between the leading edge and the trailing edge. For instance, when a standard level of a signal corresponding to the leading edge is smaller than a standard level of a signal corresponding to the trailing edge, the phase of the detection clock 16 is deviated forwards. That is, the timing for taking the signal is too early. By shifting the phase of the detection clock backward, therefore, the standard level of the leading edge becomes equal to the standard level of the trailing edge. By feeding the difference back to the timing controller, the phase is adjusted to the optimum position at all times. As for the accuracy of adjustment, for example, about 0.5 nsec. can be easily obtained.

The constitution of the present invention is not limited to those of the above-mentioned embodiments. For instance, the invention can be adapted to the one having a multi-valued reproduction level of four or more values. In this case, the standard levels are required in a number at least corresponding to the number of the levels. The invention can be further used in combination with the most likely demodulation method such as Viterbi detection. In this case, the demodulated data are not determined by the comparison of only one signal level that is detected and held; i.e., the signal level is better temporarily stored in a storage device such as shift register. The level is corrected every time when the demodulated data is discriminated. In these cases, it is desired that the device of the present invention works based on the digital processing. It is further desired that the constitution having a multi-valued reproduction level of four or more values is put into practice in combination with the most likely demodulation method. As the record/reproduction method and medium, there may be used, for example, magnetic recording disk, phase change-type optical disk and read-only optical disk (ROM) in addition to the magneto-optical recording medium.

According to the present invention, the reference levels for demodulating the data are allowed to change even when the level of the readout signal is changed due to dispersion in the recorded mark or low-frequency disturbance, and it is allowed to demodulate the data without at all accompanied by an increase in the error rate.

We claim:

1. An information reproduction method for obtaining digital data having n+1 values comprising the steps of comparing a variable readout signal with n reference levels (n is a positive integer), providing n+1 standard levels to correspond to n+1 pieces of digital data, selecting one of the standard levels that corresponds to the digital data obtained from a level of said variable readout signal at a predetermined timing, changing said selected one of the standard levels in dependence upon the level of said variable readout signal at said predetermined timing, and changing said reference levels in accordance with the change of said selected one of the standard levels.

2. An information reproduction method according to claim 1, wherein said selected one of the standard levels is changed into a value obtained by interiorly dividing the difference between level of the variable readout signal at said predetermined timing and said selected one of the standard levels.

3. An information reproduction method according to claim 1, wherein said readout signal is an analog signal or a multi-valued digital signal having three or more values.

4. An information reproduction method according to claim 1, wherein said predetermined timing occurs every time after a predetermined time interval.

5. An information reproduction method according to claim 3, wherein said predetermined timing is controlled based upon the comparison of said readout signal with at least one of said standard levels.

6. An information reproduction method according to claim 1, further comprising the step of pulling at least one of said standard levels close to the level of a data readout signal that corresponds to said at least one of said standard levels by using a data readout signal that corresponds to a known data.

7. An information reproduction device comprising a readout signal detection circuit for detecting a variable readout signal, a signal level sample-and-hold circuit for sampling and holding the level of said readout signal, reference level generators for generating variable reference levels, a level comparator for generating digital signals having discrete values by comparing said reference levels with the variable readout signal, standard level holders for holding a plurality of standard levels, a selector for selecting at least one of said standard levels depending upon the digital signals generated by said level comparator, and level compensators for correcting the at least one of said standard levels selected by said selector based upon the level of the variable readout signal sampled and held by said signal level sample-and-hold circuit, wherein said reference level generators generate said reference levels based upon the correction of said standard at least one of said levels.

8. An information reproduction device according to claim 7, wherein said level compensators correct said at least one of said standard levels selected to a value obtained by interiorly dividing the difference between said at least one of said standard levels selected and the level of the variable readout signal that is sampled and held.

9. An information reproduction device according to claim 7, wherein said reference level generators generate reference levels of values between two standard levels of said standard levels.

10. An information reproduction device comprising a timing controller for generating clocks maintaining nearly a constant time interval, a sample-and-hold circuit for sampling and holding a variable readout signal maintaining nearly a constant time interval based upon a clock generated by the timing controller, one or more reference level generators, and a level comparator for comparing the reference levels generated by the reference level generators with the variable readout signal, the information reproduction device further comprising two or more standard level holders for holding standard levels, a selector for selecting any one of a plurality of standard levels based upon the result of comparison by a level detector, and level compensators for correcting at least one the standard levels based upon the comparison of the standard level selected by the selector with the level of the variable readout signal, wherein the reference level generators generate reference levels based upon correction of at least one of the standard levels.

11. An information reproduction device according to claim 10, wherein said timing controller controls the phase of a clock based upon the level compensation data from said level compensators.

12. A signal reproduction method comprising the steps of comparing and discriminating an input variable signal level at a predetermined timing with a reference level, selecting one standard level from a plurality of standard levels based upon the result of said discrimination, changing said selected standard level so as to reduce the difference between the input variable signal level at said predetermined timing and said selected standard level, and changing said reference level into a level within two standard levels, wherein one of the two standard levels includes said changed selected standard level.

13. A signal reproduction method comprising the steps of comparing and discriminating an input variable signal level at a predetermined timing with a reference level, selecting one standard level from a plurality of standard levels based upon the result of said discrimination, utilizing a level that interiorly divides the difference between said selected standard level and said input variable signal level at said predetermined timing as a new standard level, and changing said reference level into a level within two standard levels, wherein one of said two standard levels includes said new standard level.

14. An information reproduction method according to claim 1, wherein the variable readout signal includes variation depending upon a change in a mark utilized for obtaining the variable readout signal.

15. An information reproduction method according to claim 7, wherein the variable readout signal includes variation depending upon a change in a mark utilized for obtaining the variable readout signal.

16. An information reproduction method according to claim 10, wherein the variable readout signal includes variation depending upon a change in a mark utilized for obtaining the variable readout signal.

17. A signal reproduction method according to claim 12, wherein the input variable signal includes variation depending upon a change in a mark utilized for obtaining the input variable signal.

18. A signal reproduction method according to claim 13, wherein the input variable signal includes variation depending upon a change in a mark utilized for obtaining the input variable signal.

* * * * *